(12) United States Patent
Breith et al.

(10) Patent No.: US 9,718,139 B2
(45) Date of Patent: Aug. 1, 2017

(54) TOOL FOR GRINDING TOOTHED WORKPIECES HAVING COLLISION CONTOURS

(71) Applicant: Liebherr-Verzahntechnik GmbH, Kempten (DE)

(72) Inventors: Thomas Breith, Kempten (DE); Manfred Zankl, Oberguenzburg (DE)

(73) Assignee: Liebherr-Verzahntechnik GmbH, Kempten (DE)

( * ) Notice: Subject to any disclaimer, the term of this patent is extended or adjusted under 35 U.S.C. 154(b) by 184 days.

(21) Appl. No.: 14/162,165

(22) Filed: Jan. 23, 2014

(65) Prior Publication Data

US 2014/0206269 A1 Jul. 24, 2014

(30) Foreign Application Priority Data

Jan. 24, 2013 (DE) .......................... 10 2013 001 197

(51) Int. Cl.
*B23F 21/00* (2006.01)
*B24D 5/06* (2006.01)
*B24D 18/00* (2006.01)
*B24D 5/14* (2006.01)
*B24D 5/12* (2006.01)
*B24B 53/085* (2006.01)
(Continued)

(52) U.S. Cl.
CPC .............. *B23F 21/005* (2013.01); *B23F 5/04* (2013.01); *B23F 21/026* (2013.01); *B24B 53/075* (2013.01); *B24B 53/085* (2013.01); *B24D 5/066* (2013.01); *B24D 5/123* (2013.01); *B24D 5/14* (2013.01); *B24D 11/04* (2013.01); *B24D 18/0072* (2013.01)

(58) Field of Classification Search
CPC ...... B23F 21/00; B23F 21/005; B23F 21/026; B24B 33/081; B24B 53/075; B24B 53/085; B24D 5/02; B24D 5/066; B24D 5/123; B24D 5/14; B24D 5/16; B24D 7/14; B24D 11/04; B24D 18/0072
See application file for complete search history.

(56) References Cited

U.S. PATENT DOCUMENTS 1,685,989 A * 10/1928 Eaton ................... B23F 21/026
451/543
4,961,289 A * 10/1990 Sulzer ...................... B23F 5/04
409/11
(Continued)

FOREIGN PATENT DOCUMENTS

CN 1294543 A 5/2001
CN 102806523 A 12/2012
(Continued)

OTHER PUBLICATIONS

German Search Report with English Translation dated Oct. 14, 2013 (nine (9) pages).
(Continued)

*Primary Examiner* — Timothy V Eley
(74) *Attorney, Agent, or Firm* — Crowell & Moring LLP

(57) ABSTRACT

A tool for generating tooth systems by grinding when the maximum tool diameter is limited by collision contours on the workpiece has a dressable grinding tool that is tightly connected to the tool holder. In one preferred arrangement, the dressable grinding tool is glued on the tool holder.

9 Claims, 5 Drawing Sheets

(51) Int. Cl.
B24D 11/04 (2006.01)
B24B 53/075 (2006.01)
B23F 21/02 (2006.01)
B23F 5/04 (2006.01)

(56) References Cited

U.S. PATENT DOCUMENTS 5,857,896 A * 1/1999 Stollberg .............. B23F 17/006
　　　　　　　　　　　　　　　　　　　　451/21
6,257,963 B1 * 7/2001 Thyssen ................ B23F 21/026
　　　　　　　　　　　　　　　　　　　　451/253
2012/0309271 A1　12/2012 Geiser

FOREIGN PATENT DOCUMENTS

| DE | 101 04 410 A1 | 8/2001 |
| DE | 699 01 438 T2 | 2/2003 |
| DE | 10 2004 020 364 A1 | 1/2006 |
| WO | WO 94/19135 A1 | 9/1994 |
| WO | WO 99/48646 A1 | 9/1999 |

OTHER PUBLICATIONS

Chinese-language Office Action issued in counterpart Chinese Application No. 201410031976.5 dated Dec. 2, 2016 with English translation (10 pages).

* cited by examiner

Prior Art

TOOL FOR GRINDING TOOTHED WORKPIECES HAVING COLLISION CONTOURS

BACKGROUND OF THE INVENTION

This invention relates to a tool for grinding toothed workpieces using dressable grinding tools that are optimized with regard to the maximum tool diameter by collision surfaces, like interference contours or limitations from pre-processing, such as tool run-out.

Known tools for generating grinding of tooth systems always have a tool holding mandrel or flange by means of which the tool is held in the grinding machine. This mandrel/flange requires a certain minimum diameter in order to have the necessary stability. The tool(s) is(are) fitted on this mandrel/flange and generally fastened to the mandrel/flange by laterally arranged fastening elements. So that a collision between the tool and holding mandrel/flange does not occur during grinding, the usable tool diameter only begins after this region. A certain minimum tool diameter results due to this design principle and due to the coating thickness necessary in the abrasive coating for an economical grinding process.

Modern transmissions contain, in addition to the classic gears with bores ("bored workpieces"), input-, intermediate-, and drive shafts as well, which have one or more toothings which are directly connected to the shaft and/or come from a raw material. A characteristic of these components is a workpiece geometry that has so-called collision teeth, i.e. further toothing, a shaft collar, another interference contour next to the toothing to be processed, or toothing that does not end in an end surface but instead runs out with a radius. This must be considered with regard to the design of the toothing tool already during machining before heat treatment (roughing with hob or form cutter). During the hard-fine machining necessary after hardening, the tool diameter may often only have maximally the same diameter as during the machining before heat treatment.

In general, these workpieces are processed after the heat treatment using the following hard-fine machining processes.
1. Generating grinding using electrically coupled CBN worm grinding wheels
2. Profile grinding using electrically coupled CBN profile grinding wheels
3. Gear honing
4. Generating grinding using dressable cutting material (aluminum oxide, CBN or similar)
5. Profile grinding using dressable cutting material (aluminum oxide, CBN or similar)

If dressable tools are used (processes 4 & 5), then, due to the collision situation at grinding wheels and worm grinding wheels and a conventional tool design, the installation space is lacking for the necessary coating thickness which is required in order to always generate new, fresh, easy to cut grinding tool surfaces, even during multiple dressing of small cutting material coatings. Due to this circumstance, dressable profile- and generating worm grinding wheels are not economical in this application, even though these cutting materials are used extremely successfully in "collision-free" tooth systems.

For this reason, these tooth systems have often been hard-fine processed using processes 1-3 up until now. This is due to economic reasons and because tools made from dressable cutting materials can be more easily re-profiled. However, a process with dressable tools would be desirable.

It is, however, necessary for this purpose to realize a certain minimum coating thickness in order to obtain an economically usable tool. At the same time, the tool mandrel requires a minimum diameter so that the necessary stability and stiffness is realized. These two limiting conditions define or delimit the possible radial installation space for the tool.

German document DE 101 04 410 A1 discloses a tool for generating grinding of tooth systems during which the grinding tool consists of a bearing ring and an abrasive body which is fitted on a conical mounting flange. In this way, the grinding tool is fixed without play. The deformation resistance of the bearing ring is thereby greater than that of the abrasive body. Due to this arrangement, displacements and deformations of the worm grinding wheel caused by centrifugal forces are minimized. Disadvantageous in this embodiment are the spatial requirements required in order to accommodate all function elements in the tool and at the same time guarantee the necessary stability of the holder.

International PCT publication WO 94/19135 discloses a single-part galvanically-coated tool having two different portions. These two portions are coated with hard materials in order to undertake different grinding tasks during the hard-fine machining process. The grinding tool comprises a conical mounting sleeve with which it is fitted on the round tool mandrel and tightened. This embodiment also requires a certain minimum height for the tool. In connection with a stable round mandrel for the tool, this results in a certain minimum tool diameter. In this arrangement of the tool, the tool diameter and/or the coating thickness are no longer changed thereby, since no dressing of the abrasive coating takes place. If this tool is worn out, it must first be decoated in order to be subsequently newly recoated. Disadvantageous in this embodiment is that changes to the profile shape of the grinding tool can only be generated during the manufacture thereof. During hard-fine machining, such changes or re-profilings are no longer possible due to the low coating thickness of the abrasive material. This is only possible using dressable grinding tools.

German document DE 10 2004 020 364 A1 likewise describes a tool for generating grinding of tooth systems having a multi-part grinding tool with dressable abrasive bodies. In this case, a multi-part tool is described in which different abrasive bodies are clamped on a common base mandrel.

SUMMARY OF THE INVENTION

It would be desirable to make a new type of tool available to a person skilled in the art for economical hard-fine machining of workpieces having an interference contour which is next to the toothing to be processed.

A use of grinding tools with dimensions according to the prior art is no longer possible for tooth systems of this type due to reasons of collisions. If a tool with a reduced outer diameter is used, with a conventional design, then the remaining residual wall thickness of the dressable abrasive coating is reduced to such an extent that an economical use is no longer possible.

It is thus the object of the present invention to configure the structure of the grinding tool such that the necessary stiffness of the holding mandrel is guaranteed in order to generate the required grinding quality and at the same time provide the necessary coating thickness for an economical number of dressing cycles.

This problem is solved by a tool for generating grinding having a dressable worm grinding wheel with a small outer diameter and a coating thickness necessary for a repeated dressing cycle. This is achieved, in contrast to conventional tool design, with an abrasive coating that is no longer fitted on and tightened onto the tool holder, which consists of a tool mandrel or a mounting sleeve. The abrasive coating is glued directly to the tool holder, and in particular the tool mandrel or mounting sleeve.

Due to this design, the stops arranged laterally adjacent to the tool and the previously necessary fastening and fixing units are not needed. In addition, the worm grinding wheel sleeve, on which the worm grinding wheel is usually glued in conventional tool design, is also not needed, particularly if the grinding tool is composed of grinding wheel segments.

Due to this development, significantly smaller tool diameters can be realized for dressable tools and thus enable an economical and flexible machining of workpieces having collision contours, even while using dressable grinding tools. Due to the segmented design of the grinding tool, tool widths, which cannot be realized using a single-part tool design, can be realized. The maximum width of the worm blank is known to be limited by the production method thereof. Beginning at a certain ratio of worm width to material thickness, the worm blank can no longer press with the necessary homogeneity. This tool would then have a disadvantage, e.g. due to different grinding behavior across the width thereof or different absorption capacity for coolants, which would again lead to problems during balancing of the tool.

Further advantageous embodiments form the subject matter of the claims.

The glued tool can again be combined with further tools, in case multiple tooth systems should be processed serially on a workpiece, when a toothing should be processed with different grinding processes, e.g. generating grinding and profile grinding. Further, it is also possible to machine different grinding processes, like toothing grinding and grinding outer diameters, surfaces, grooves, or slots with a tool according to the invention. A combination of dressable and non-dressable tools is also possible in order to machine one or more tooth systems of surfaces.

A combination is also conceivable, made of a dressable grinding tool to machine a collision contour together with a non-dressable tool. In this way, a still smaller collision contour can be machined, at which machining using a dressable tool is no longer economically presentable. This enables machining of tooth systems that up until now could not be economically processed using generating grinding.

A further application of these tools is for workpieces in which the tooth system does not end in an end face, but rather in a tool run-out. In this case, the diameter of the grinding tool may not be larger than the diameter from the preprocessing.

Further features, details, and advantages of the invention will be described by means of embodiments depicted schematically in the drawings.

DETAILED DESCRIPTION OF THE INVENTION

Figure 1:
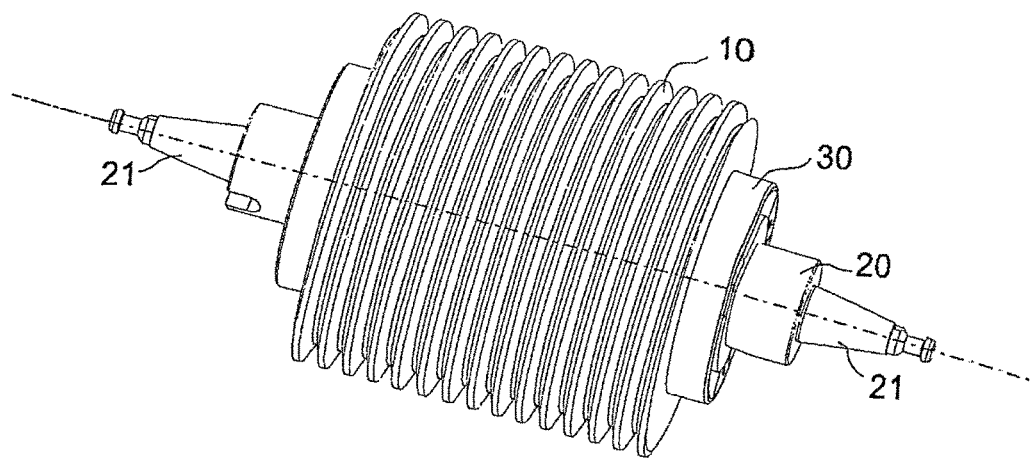
FIG. 1 shows a grinding tool according to the prior art.

FIG. 1 shows a grinding tool according to the prior art. One or more grinding tools 10 are mounted on a tool mandrel 20 having an outer surface defining an outer tool mandrel diameter as well as double-sided mounting surfaces 21 for mounting the tool in the machine head of a tooth grinding machine (not depicted here), and each tool is fixed on the tool mandrel by fixing with a clamping cover or clamping unit 30.

Figure 2:
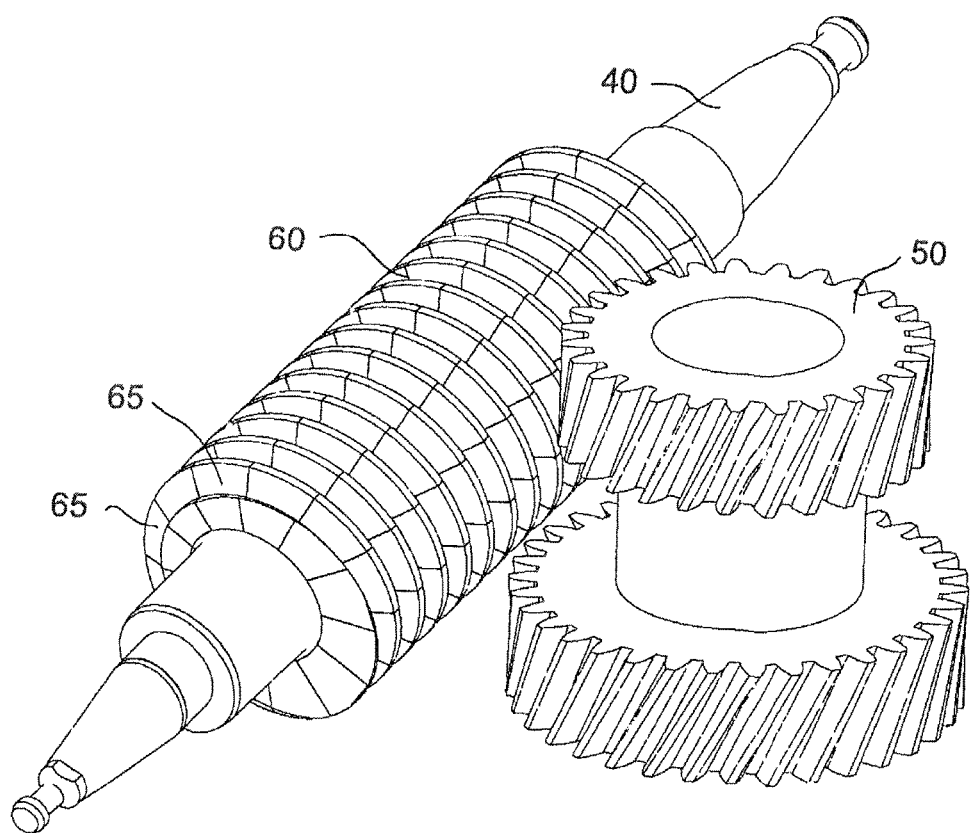
FIG. 2 shows a grinding tool engaged with a workpiece having a collision contour.

FIG. 2 shows a perspective view of a grinding tool 60 according to the invention. By means of the double toothing 50 depicted, the difficulty can also be seen which leads to a limit of the diameter of the grinding tool. Based on the helical gearing and the slanted position of the grinding tool necessitated thereby in the engaged position, the tool diameter may not exceed a certain diameter, since otherwise this would lead to a collision of the tool with the lower toothing.

The design of the worm grinding wheel can likewise be seen, which design consists of a plurality of individual segments 65 that surround the outer surface circumferentially, that are adjacent to each other circumferentially, and that are glued radially to the outer circumference of the tool mandrel.

FIGS. 3a to 3e show by way of example different embodiments of the tool arrangement with one or more grinding tools which are engaged with a workpiece having a collision contour, in the example of the double toothing 50 from FIG. 2. The view is depicted from the direction of a machine head in the direction toward the workpiece to be machined.

Figure 3A:
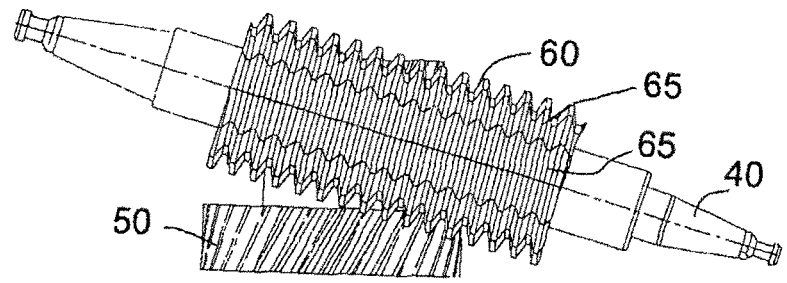
FIGS. 3a-3e show embodiments of grinding tools according to the invention.

FIG. 3a shows a dressable worm grinding wheel 60 which consists of circular segments 65 glued radially to the outer diameter on the tool mandrel 40. The slanted position of the tool is determined, among other reasons, by the helix angle and the tool design.

Figure 3B:
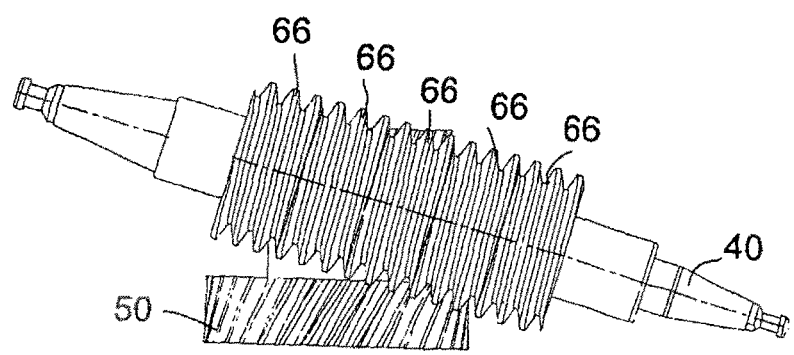

A dressable worm grinding wheel is likewise shown in FIG. 3b, which worm grinding wheel in this case is constructed of a plurality of ring sections 66 which again are glued to the tool mandrel 40.

Figure 3C:
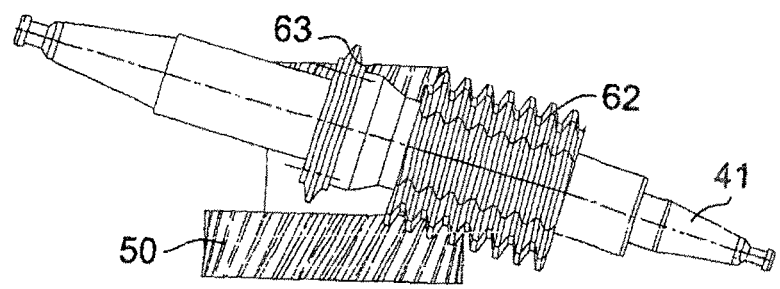

The combination tool shown in FIG. 3c consists of a dressable worm grinding wheel 62 composed of individual segments glued to a tool mandrel 41, and a mounted grinding wheel 63 which can be implemented as dressable or non-dressable.

Figure 3D:
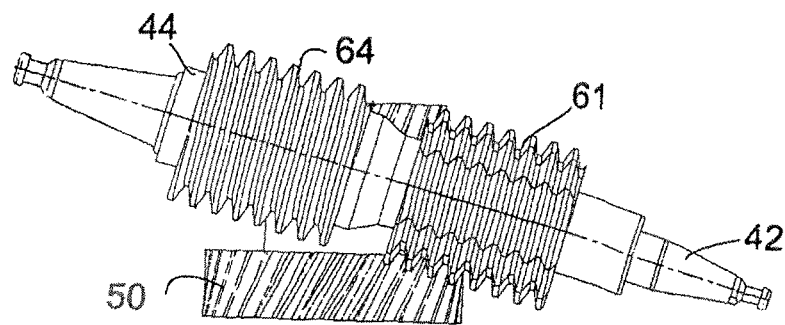

The tool arrangement with two worm grinding wheels, as is shown in FIG. 3d, consists likewise of a glued on worm grinding wheel 61 and a mounted worm grinding wheel 64 that is implemented as dressable or non-dressable, and which is fixed to a tool mandrel 42 in this case by a clamping cover 44.

Figure 3E:
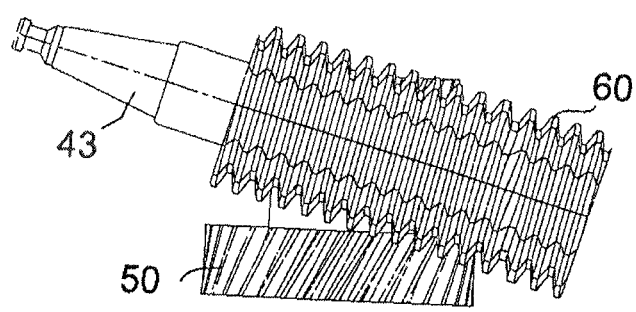

FIG. 3e shows a tool arrangement with a single-sided mounting cone for the tool in the tool holder.

Figure 4:
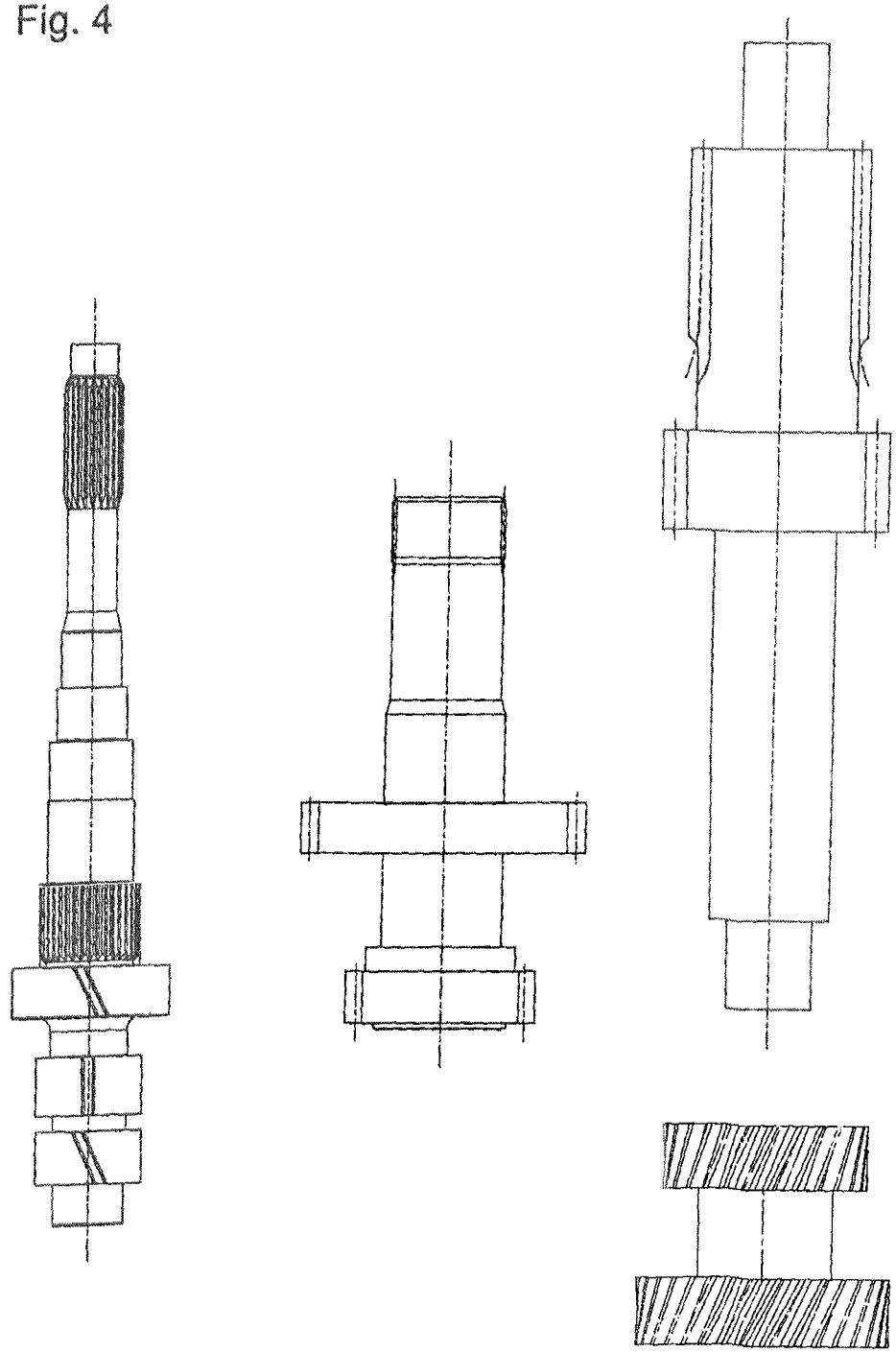
FIG. 4 shows exemplary workpieces according to the invention.

Exemplary workpieces, as they can be machined according to the invention using a grinding tool, are depicted in FIG. 4.

The invention claimed is:
1. A tool for grinding tooth systems in which a maximum tool diameter is limited by collision contours on a workpiece, comprising:
   a tool mandrel having an outer surface defining an outer tool mandrel diameter and with a mounting surface at least at one end that is mountable in a machine head of a tooth grinding machine, and
   a grinding tool mounted on the outer surface defining said outer tool mandrel diameter,
   wherein the grinding tool is a dressable grinding tool including a plurality of individual segments that surround the outer surface circumferentially, that are adjacent to each other circumferentially, and that are tightly connected to the outer surface defining the outer tool mandrel diameter by gluing.

2. The tool according to claim 1, wherein the dressable grinding tool consists of at least two circular segments that are glued radially on the tool mandrel.

3. The tool according to claim 1, wherein the dressable grinding tool has regions with at least two different coating specifications, at least two different grains, at least two different binders, and/or at least two different physical or chemical binder characteristics, and that are designed with regard to use as roughing or finishing tools for at least one toothing.

4. The tool according to claim 3, wherein the regions have different screw geometries, and wherein the regions are configured to grind two or more different tooth systems.

5. The tool according to claim 1, wherein the tool mandrel has at least two regions, wherein at least one of said two regions is a region in which said dressable grinding tool can be glued, and wherein at least one other of the two regions is a region in which a dressable or non-dressable grinding tool can be clamped or fastened.

6. The tool according to claim 1, wherein the tool mandrel has at least two regions, and wherein said grinding tool is one of several grinding tools to be mounted on said regions.

7. The tool according to claim 1, wherein the grinding tool is for tooth grinding, and wherein said grinding tool is one of several grinding tools to machine non-toothed geometries, diameters, surfaces, grooves, or slots.

8. The tool arrangement according to claim 1, wherein the mounting surface is one of two mounting surfaces that are mountable in the machine head of the tooth grinding machine.

9. The tool according to claim 2, wherein the dressable grinding tool has regions with at least two different coating specifications, at least two different grains, at least two different binders, and/or at least two different physical or chemical binder characteristics, and that are designed with regard to use as roughing or finishing tools for at least one toothing.

\* \* \* \* \*